Patented Dec. 30, 1930

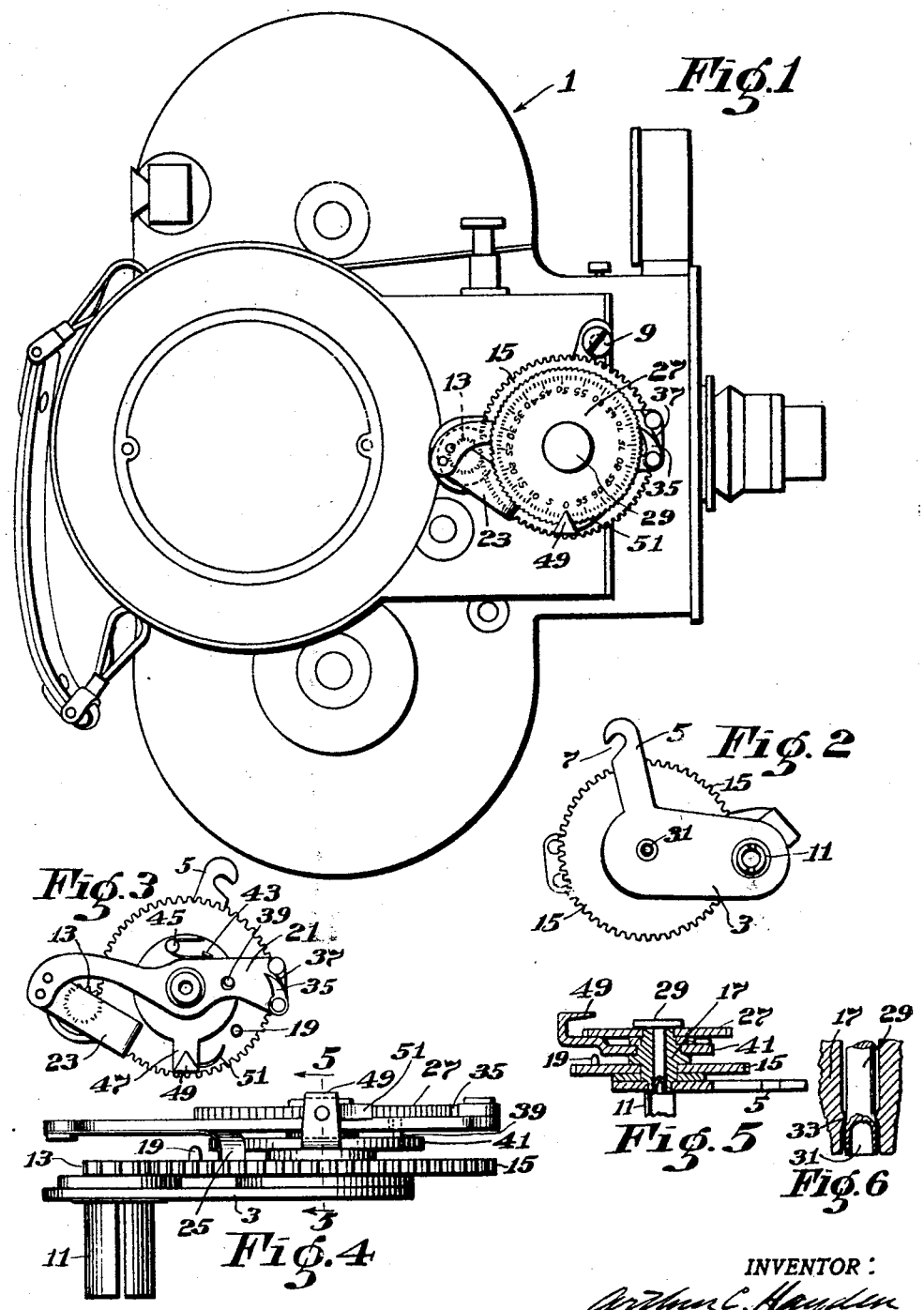

1,787,271

UNITED STATES PATENT OFFICE

ARTHUR C. HAYDEN, OF BROCKTON, MASSACHUSETTS

AUDIBLE FOOTAGE METER AND EXPOSED-FILM INDICATOR FOR MOTION-PICTURE CAMERAS

Application filed February 10, 1930. Serial No. 427,156.

The invention to be hereinafter described relates to motion picture cameras.

A purpose of the invention is to provide in a unitary device means whereby increments of feed of the film through the camera are audibly signalled, and means for automatically indicating the length of exposed film.

The photographer and especially the amateur frequently find it difficult to estimate the minimum length of film which should be exposed to enable the observer satisfactorily to appreciate the subject thereof when projected on the screen. Motion picture cameras have been provided with indicators for showing the length of exposed film, but when the camera is held to the eye by one hand, and the other hand is occupied in controlling starting and stopping of the film feeding motor, the indicator cannot be conveniently observed. The device of the present invention audibly announces increments of feed and may give the signal on feed of each foot of film in the camera. Also this device includes an indicator which will be advanced an increment on each audible signal, and thereby register exposure of each foot of film.

And another purpose of the invention is to provide an audible signal and indicator device which may be quickly and easily applied to a motion picture camera of standard type without material alteration thereof.

The character of the invention may be best understood by reference to the following description of one good form thereof shown in the accompanying drawing, wherein:

Fig. 1 is a side elevation of a motion picture camera equipped with an audible signal and indicator device embodying the invention;

Fig. 2 is a view looking toward the bottom of the device;

Fig. 3 is a view of the mechanism disclosed on removal of the indicator wheel;

Fig. 4 is a side elevation of the device;

Fig. 5 is a transverse section taken on line 5—5 of Fig. 4; and

Fig. 6 is a detail to be referred to.

Referring to the drawing, 1 designates a usual motion picture camera comprising a casing containing a coil spring motor which drives a sprocket wheel to feed the film from the let-off reel to the take-up reel. An end of the sprocket wheel shaft is exposed externally of the camera, and has a socket therein adapted to receive a crank for use when it is desired to feed the film by hand. These parts may be of usual construction, and therefore it is unnecessary to show and describe them herein.

The audible signal and indicator device shown herein as one good form of the invention, comprises a support 3 in the form of a plate having an arm 5 with a hook 7 adapted to be applied to the shank of the usual screw 9 on the camera and be held by the head of the screw.

A split shaft 11 is mounted in a bearing in the plate 3 and is formed to fit in the crank receiving socket of the sprocket wheel shaft. On the split shaft is a pinion 13 meshing with a gear 15 rotatable on a stud 17 mounted on and secured to the plate 3, said gear having a nub 19 projecting from a face thereof.

Pivotally mounted on the stud 17 is a rock lever 21 having a leaf spring finger 23 secured to one end thereof and with a downwardly curved end 25 normally engaging a face of the gear 15. The design of the pinion and gear is such that the latter will make one complete rotation on feed of each foot of film in the camera. In the course of each rotation of the gear in a contra-clockwise direction (Fig. 3), the nub will reach the downwardly curved end of the spring finger and wipe past the same. In so doing it will push said end up away from the face of the gear, and when the nub passes said end, the latter will snap down against the gear with a sharp click and signal that a foot of film has been fed.

To indicate the length of exposed film, an indicator wheel 27 is provided having graduations marked thereon corresponding to the number of feet of film used in the camera. In the present instance this wheel is marked with graduations and numbers representing 100 feet of film. This indicator wheel is rotatably mounted on the reduced upper end of the stud 17, referred to, and is prevented from escape from the stud by a pin 29 having a head engaging the outer face of the wheel, and a stem projecting down into a bore 31 (Fig. 6) in the stud. The lower end portion of the stem is enlarged somewhat, and the bore has an internal rib 33, the construction being such that when the pin stem is pressed into the bore, its enlargement will press against and wipe past the rib, and then the latter will be effective to prevent escape of the pin from the stud.

To advance the wheel an increment on feed of each foot of film through the camera, it may be in the form of a rachet wheel, and cooperating therewith is a pawl 35 mounted on the lever 21 at the opposite end from that carrying the spring finger 23, said pawl being urged toward the teeth of the ratchet wheel by a wire spring 37. The lever is limited in its oscillatory movement by a pin 39 on a disk 41 fixed on the stud 17. The pin occupies a hole in the lever having a diameter somewhat larger than that of the pin. The lever is rocked in one direction by engagement of the nub 19 with the spring finger end 25, and in the opposite direction by a wire spring 43 mounted on a stud 45 on the disk 41. Projecting from the disk is a lug 47 having an index or pointer 49 for cooperation with the numbered graduations on the indicator wheel. The lug carries a spring dog 51 engaging the teeth of the sprocket wheel to prevent reverse movement thereof.

To apply the device to the camera, the split shaft 11 is pressed into the handle receiving shaft of the camera, and has sufficient friction to insure rotation therewith. The hook 7 of the arm 5 is applied to the shank of the screw 9, and the latter is tightened thereby to secure the arm to the camera. The device is now ready for operation. On feed of each foot of film through the camera, the gear 15 will receive a complete rotation, and the nub 19 will wipe past the spring finger end 25 producing the click, referred to, audibly signalling that a foot of film has been fed. If, for example, the photographer desires to feed and expose 10 feet of film, he will count ten successive clicks, and this will be an accurate signal that said length of film has been fed. His hands will be free, one to hold the camera, and the other to control starting and stopping of the film feed motor, and his eye may employed in looking through the camera at the subject being photographed without distraction.

When the nub 19 reaches the spring finger end on each rotation of the gear 15, the lever 21 will be dragged and rocked slightly as limited by the hole in the lever and the pin 39, causing the pawl 35 to advance the ratchet wheel an increment registering feed of a foot of film and exposure thereof. When the nub has wiped past the finger, the spring 43 will become effective to rock the lever in the opposite direction, thereby retreating the pawl 35 in readiness for the next increment of feed of the indicator wheel. The spring dog 51 will prevent reverse movement of the indicator wheel while the pawl is retreating, and will hold said wheel against movement until it is again advanced by the pawl.

It will be understood that the invention is not limited to the specific embodiment shown, and that various deviations may be made therefrom without departing from the spirit and scope of the appended claims.

What is claimed is:

1. In a unitary device for application to a motion picture camera, the combination of means for automatically audibly signalling length increments of feed of film in the camera, and means cooperating therewith for automatically indicating the length of exposed film.

2. In a unitary device for application to a motion picture camera, the combination of means for automatically audibly signalling length increments of feed of film in the camera, and means operated thereby for automatically indicating the length of exposed film.

3. In a unitary device for application to a motion picture camera, the combination of means for automatically audibly signalling increments of feed of film in the camera, and means rotated step-by-step thereby for indicating the length of exposed film.

4. In a motion picture camera having means for feeding film therein including a shaft having a socket accessible externally of the camera,—an attachment comprising a shaft adapted for connection with said socket, means operated by the attachment shaft for audibly signalling increments of feed of film in the camera, and means operated by the attachment shaft for indicating the length of exposed film.

5. In a unitary device for application to a motion picture camera, the combination of a support, a shaft thereon, a pinion on said shaft, a gear meshing with the pinion, a nub on the gear, a stud on the support, a rock lever mounted on the stud, and a spring finger on the lever normally engaging the gear, said nub being adapted to wipe past the spring finger and cause it to click against the gear on each rotation thereof, thereby to signal increments of feed of the film.

6. In a unitary device for application to a motion picture camera, the combination of a support, a shaft thereon, a pinion on said shaft, a gear meshing with the pinion, a nub on the gear, a stud on the support, a rock lever mounted on the stud, a spring finger on one end of the lever normally engaging the gear, a pawl on the opposite end of the lever, and a ratchet wheel on the stud having graduations and numbers representing feet of film, said nub being adapted to wipe past the finger and cause the same to click against the gear and cause said lever to advance the pawl and move the ratchet wheel an increment.

7. In a unitary device for application to a motion picture camera, the combination of a support, a shaft thereon, a stud on the support, a ratchet wheel on the stud marked with graduations and numbers representing feet of film, a rock lever on the stud, a pawl on the lever, and means operated by the shaft for operating the lever to cause its pawl to advance the ratchet wheel step-by-step.

8. In a unitary device for application to a motion picture camera, the combination of a support, a shaft thereon, means operated by the shaft for audibly signalling length increments of feed of film in the camera, and an indicator wheel on the support marked with graduations representing feet of film and advanced step-by-step by the audible signal means.

9. In a unitary device for application to a motion picture camera, the combination of a support, a shaft thereon, a pinion on said shaft, a gear meshing with the pinion, a nub on the gear, a stud on the support, a rock lever mounted on the stud, a spring finger on the lever normally engaging the gear, said nub being adapted to wipe past the finger to cause the same to click against the gear on each rotation thereof, means for limiting the rocking movement of the lever, an indicator sprocket wheel on the stud, and a pawl on the lever for advancing the wheel an increment each time the nub wipes past the finger.

10. In a unitary device for application to a motion picture camera, the combination of a support, a stud thereon, a shaft on the support, an indicator wheel on the stud having graduations and numbers representing increments of feed of film, means including gearing driven by said shaft for rotating the indicator wheel step-by-step, and an audible signal operated by the gearing announcing increments of feed of the film.

11. In a unitary device for application to a motion picture camera, the combination of a support, a stud on the support, a shaft on the support adapted to be driven by the film feed means of the camera, an indicator wheel on the stud marked with graduations and numbers representing increments of feed of film, a pointer on the stud cooperating with the indicator wheel, a pinion on the shaft, a gear on the stud driven by the pinion, means operated by the gear for audibly signalling increments of feed of the film, and means operated by the gear for rotating the indicator wheel step-by-step to indicate the length of exposed film.

12. In a unitary device for application to a motion picture camera, the combination of a support, a stud thereon, a shaft on the support, a pinion on the shaft, a gear on the stud rotated by the pinion, a ratchet wheel indicator on the stud marked with graduations and numbers representing increments of feed of film, a rock lever on the stud, a pawl on the lever engaging the ratchet wheel, a dog carried by the stud for preventing reverse movement of the ratchet wheel, a spring finger on the lever, and a nub on the gear adapted to wipe past the spring finger and produce a click on each rotation of the gear, said lever being rocked as the nub wipes past the finger to cause the pawl to advance the indicator wheel an increment.

ARTHUR C. HAYDEN.